UNITED STATES PATENT OFFICE.

EUGEN SAPPER, OF LUDWIGSHAFEN, GERMANY, ASSIGNOR TO THE BADISCHE ANILIN AND SODA FABRIK, OF SAME PLACE.

PROCESS OF MAKING PHTHALIC ACID.

SPECIFICATION forming part of Letters Patent No. 644,331, dated February 27, 1900.

Application filed November 16, 1897. Serial No. 58,749. (Specimens.)

*To all whom it may concern:*

Be it known that I, EUGEN SAPPER, doctor of science, a subject of the King of Bavaria, residing at Ludwigshafen-on-the-Rhine, in the Kingdom of Bavaria and Empire of Germany, have invented new and useful Improvements in the Manufacture and Production of Phthalic Acid, (for which patents were obtained in Germany March 31, 1896, No. 91,202; in England August 17, 1896, No. 18,221; in France September 16, 1896, No. 259,766; in Belgium September 28, 1896, No. 123,751; in Italy September 30, 1896, XXXII, 42,724, LXXXIII, 461; in Austria June 16, 1897, No. 47/2,244;
in Hungary January 30, 1897, No. 8,747, and in Spain November 21, 1896, No. 19,712,) of which the following is a specification.

My invention consists in a new process for the production of phthalic acid.
The following will serve to illustrate the manner in which the invention can best be carried into effect; but I do not limit my process to this example. The parts are by weight.

Mix together about one hundred (100) parts of naphthalene, one thousand five hundred (1,500) parts of sulfuric acid, (mono-hydrate one hundred per cent. (100%) $H_2SO_4$,) and fifty (50) parts of mercuric sulfate and warm the mixture till naphthalene dissolves. Next heat the mixture further in a retort or other vessel suitable for distilling. As the temperature reaches about two hundred degrees centigrade (200° C.) the beginning of the reaction can be noticed, and it proceeds more rapidly at two hundred and fifty degrees centigrade, (250° C.) Sulfurous acid and carbonic acid are given off by the melt. Raise the temperature finally to three hundred degrees centigrade (300° C.) and higher and maintain the heat until the contents are solid or viscous. While heating, collect the distillate in a suitable receiver. The distillate consists of sulfuric acid diluted with the water formed during the reaction and the phthalic acid produced partly as anhydride and some sulfo-phthalic acid. The phthalic acid separates out almost completely on cooling and is collected by filtering or by treatment in a centrifugal machine. The residue in the retort contains the mercuric sulfate, which can be used again in another operation.

Instead of naphthalene in the above example there can be used any of the following aromatic substances whose nuclei consist in whole or in part of the naphthalene nucleus— viz., sulfo-acids of naphthalene, alpha or beta naphthol or the sulfo-acids thereof, alpha or beta naphthylamine or the sulfo-acids thereof, mono-nitro-naphthalene or the sulfo-acids thereof, anthracene, phenanthrene, and instead of mercuric sulfate itself there can be used mercury or the oxids or compounds thereof capable of being converted into mercuric sulfate in the course of the process. Also the quantity of sulfuric acid used and its strength may be varied within wide limits.

The following are instances of mixture which can be similarly treated: (*a*) one hundred (100) parts beta-naphthol dissolved in three hundred (300) parts of oleum, (fuming sulfuric acid,) containing about twenty per cent. (20%) free sulfuric anhydride, and then added to about one thousand (1,000) parts mono-hydrate and forty (40) parts mercuric nitrate; (*b*) one hundred (100) parts naphthionic acid, one thousand (1,000) parts concentrated sulfuric acid, (containing about ninety to ninety-five per cent. (90 to 95%) $H_2SO_4$,) and thirty (30) parts mercuric oxid; (*c*) one hundred (100) parts phenanthrene, two thousand (2,000) parts mono-hydrate sulfuric acid, and twenty (20) parts mercury.

I employ herein the term "naphthalene body" to designate naphthalene either in its unsulfonated or sulfonated form.

Now what I claim is—

1. The process of producing phthalic acid which consists in heating a substance whose formula contains that of the naphthalene nucleus with sulfuric acid in the presence of mercuric sulfate, substantially as described.

2. The process of producing phthalic acid which consists in heating a hereinbefore-defined naphthalene body with sulfuric acid until phthalic acid is produced, substantially as described.

In testimony whereof I have hereunto set my hand in the presence of two subscribing witnesses.

EUGEN SAPPER.

Witnesses:
   GUSTAV LICHTENBERGER.
   BERNHARD C. HESSE.